United States Patent [19]
Henson

[11] 3,766,687

[45] Oct. 23, 1973

[54] APPARATUS FOR ENTRY CONTROL

[75] Inventor: Bryan K. Henson, Dallas, Tex.

[73] Assignee: Docutel Corporation, Dallas, Tex.

[22] Filed: Feb. 16, 1972

[21] Appl. No.: 226,916

[52] U.S. Cl.................. 49/35, 194/4, 235/61.11 R, 235/61.7 B
[51] Int. Cl............................................ E05b 63/00
[58] Field of Search.................. 49/35; 235/61.11 R, 235/61.7 B; 194/4; 340/149 A

[56] References Cited
UNITED STATES PATENTS

| | | | |
|---|---|---|---|
| 1,866,716 | 7/1932 | McCormick et al................ | 194/4 C |
| 2,260,643 | 10/1941 | Rosan ................................. | 194/4 R |
| 3,015,087 | 12/1961 | O'Gorman....................... | 235/61.7 B |
| 3,087,018 | 4/1963 | Pferd................................... | 194/4 E |
| 3,457,391 | 7/1969 | Pamamoto.................. | 340/149 A X |
| 3,564,214 | 2/1971 | Cooper........................ | 340/149 A X |
| 3,576,538 | 4/1971 | Miller ............................ | 340/149 A |
| 3,595,358 | 7/1971 | Chase................................. | 194/4 R |

Primary Examiner—Dennis L. Taylor
Attorney—D. Carl Richards et al.

[57] ABSTRACT

Coded credit cards are becoming increasingly more an accepted means for controlling the operation of dispensing systems of various categories and kinds. The coded credit card is inserted into the dispensing machine wherein various checking and dispensing functions are performed as a result of information obtained from the coded card. An entry gate to the dispensing machine prohibits improperly sized credit cards and miscellaneous debris from being inserted into the system. Entry of undesirable credit cards and debris is prevented by the entry gate that is locked except upon presentation of a correctly sized card into a card throat. A properly sized card actuates two triggers each of which displace a locking bar to a position allowing free movement of the entry gate. Upon movement of the locking bar a properly sized credit card may be inserted into the dispensing system past the entry gate. The inner face of the entry gate is formed by an arcuate section. As a credit card is being returned to a user, it engages the arcuate section lifting the gate and allowing removal of the card.

23 Claims, 6 Drawing Figures

Patented Oct. 23, 1973

APPARATUS FOR ENTRY CONTROL

This invention relates to entry gate control, and more particularly to control of entry to selected sized documents into a dispensing mechanism.

Recent studies have shown that there is an increasing use being made of coded credit cards to actuate automatic dispensing systems of various kinds and configurations. Everything from gasoline, to food and currency are being dispensed by automatic machines in response to a properly coded credit card. These systems operate by a user inserting his credit card into an entry throat behind which is internally located a transport mechanism for carrying the card into the dispensing system. Usually, the transport is part of a code reading mechanism that functions to scan the card for the coded data. Various types of code readers are available including optical recognition, magnetic recognition and punched hole recognition. These code reading mechanisms, although reliably constructed, include some mechanically fragile components which when damaged will render the entire dispensing mechanism inoperative.

Where such dispensing systems are located in areas not under close surveillance pranksters and sometimes vandals attempt to insert odd sized credit cards and miscellaneous debris into the system. Such odd sized cards and debris when forced into the code reading mechanism often results in considerable damage and the dispensing system must be shut down for repairs.

A feature of the present invention is to provide entry control into dispensing systems thereby permitting only selected sized credit cards to enter the dispensing mechanism. The entry control itself must, of course, be reliable otherwise a user with a properly sized credit card may be denied use of the system. Another feature of the present invention is to provide an entry control for simplicity sufficient to insure reliability.

In accordance with the present invention, apparatus for document entry control into a dispensing system includes a housing having a passage therein to accept and orient a presented document for transport into the system. An actuating lever, internal within the system, is pivotally mounted to the housing to rotate about a position intermediate with the passage. Pivotally mounted to the actuating lever is a trigger that extends into the passage of the housing. A locking bar is also pivotally mounted to the actuating lever to be rotated from a first position to a second position by actuating the trigger to engage the locking bar. Also pivotally mounted to the actuating lever is a gate that locks in a first position for barring entry of a document into the system by engagement with the locking bar when the locking bar is in the first position. The gate rotates to a second position by a document in the passage when the locking bar is rotated by the trigger into the second position thereof.

A more complete understanding of the invention and its advantages will be apparent from the specification and claims and from the accompanying drawings illustrative of the invention.

Referring to the drawings.

Figure 1:
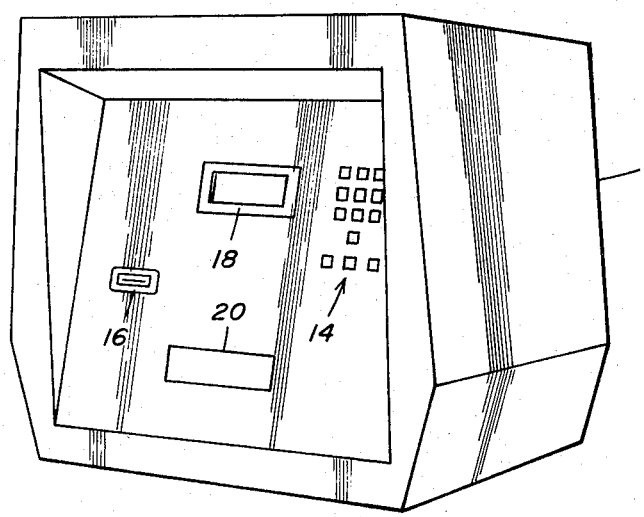
FIG. 1 is a pictorial view of a currency dispenser showing an application of where the entry control of the present invention is applied.

Referring to FIG. 1, there is shown a currency dispenser wherein entry control is employed and includes a console 10 which houses mechanical operating sections of the system, and in addition, customer interface equipment. On the front panel of the console 10 there is arranged an array of thirteen push-button keys 14 for use by a customer to interface with the currency dispenser. Ten of these keys, marked 0-9, are to enable a user to insert his assigned identification code for verification of his authority to use a credit card presented to the machine through a card gate 16. One of the remaining three keys is a "clear" push-button for correcting mistakes made by the user in inserting his assigned identification code. The remaining two keys are for selecting one of two currency packages to be dispensed.

In addition to the thirteen push-button keys, and the card gate 16, the front panel of the console 10 includes an instruction window display 18 that provides for viewing an illuminated display message drum. The messages on this drum instruct the user in the operation of the currency dispenser. The last user interface on the front panel of the console 10 is a cash drawer 20 that fits flush with the panel in a closed and locked position.

Upon presentation of a credit card to the card 16 of the console 10, it is transported through a plurality of reading stations by a card reader (not shown) to activate various systems in a preordered sequence. Typically, a dispenser may be activated by a standard "A" size plastic credit card with a strip of magnetic material located on the back side and containing coded data read by a card reader. It is this coded data that activates the various systems in the preordered sequence. For a more complete understanding of the operation of the currency dispenser, reference is made to the copending patent application of John R. Hicks and William C. Bortzfield, entitled CREDIT CARD AUTOMATIC CURRENCY DISPENSER, Ser. No. 59,241, filed July 29, 1970, and assigned to the assignee of the present invention.

In a normal dispensing cycle, a credit card is transported through a card reader in one direction during the first part of a sequence and then returned to the user through the card gate 16 at a later step near the completion of the cycle. To prevent odd sized credit cards from being forced into the card reader and miscellaneous debris from being jammed into the card gate 16, an entry gate is provided immediately behind the card gate within the console 10.

Figure 2:
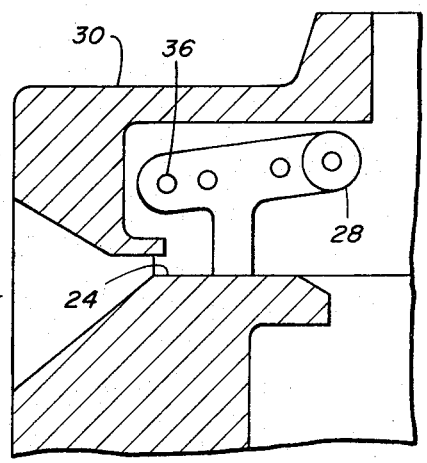
FIGS. 2-5 are a series of sectional views of the entry throat of a dispensing system showing the arrangement of parts for document entry control.

Referring to FIGS. 2-6, entry into the console 10 is controlled by means of an entry gate 22 positioned to extend across a card throat 24 and locked into a closed position by means of locking bars 26 and 26a. Both the entry gate 22 and the locking bars 26 and 26a are pivoted to an actuating lever 28 that is pivoted at arms 28a and 28b to a housing 30 containing the card throat 24. In the embodiment shown, the actuating lever 28 is biased by means of a spring 32 (see FIG. 6) into a position intermediate the card throat 24. The position of the lever 28 is best shown in FIG. 2 which is a cross-section taken immediately to the right of the arm 28a of FIG. 6.

Also pivotally mounted to the actuating lever 28, in addition to the locking bars 26 and 26a and the gate 22, are triggers 34 and 34a. In the embodiment shown, the triggers 34 and 34a are made up of five thin sections grouped together. The triggers 34 and 34a are mounted to the actuating lever 28 on a shaft 36 which also supports the entry gate 22.

Figure 3:
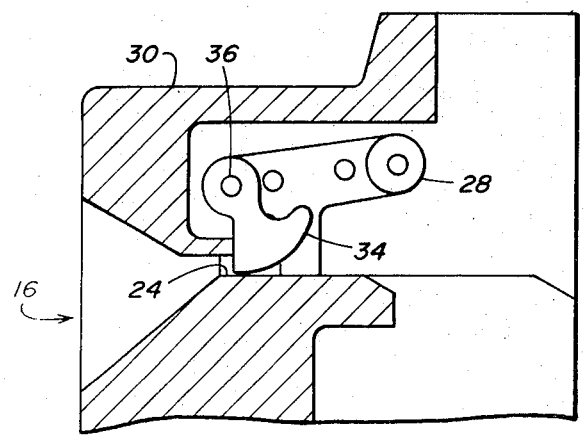
Figure 4:
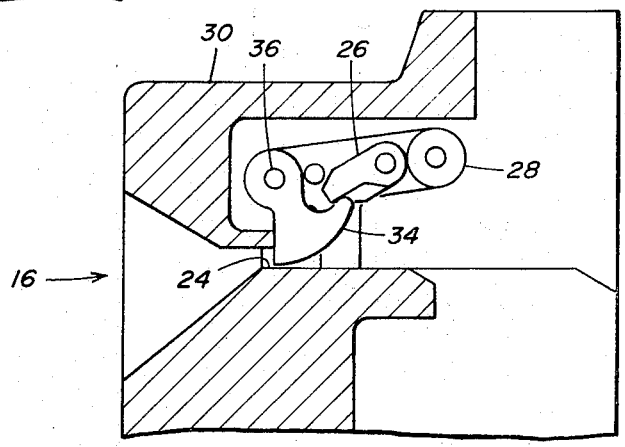
Figure 5:
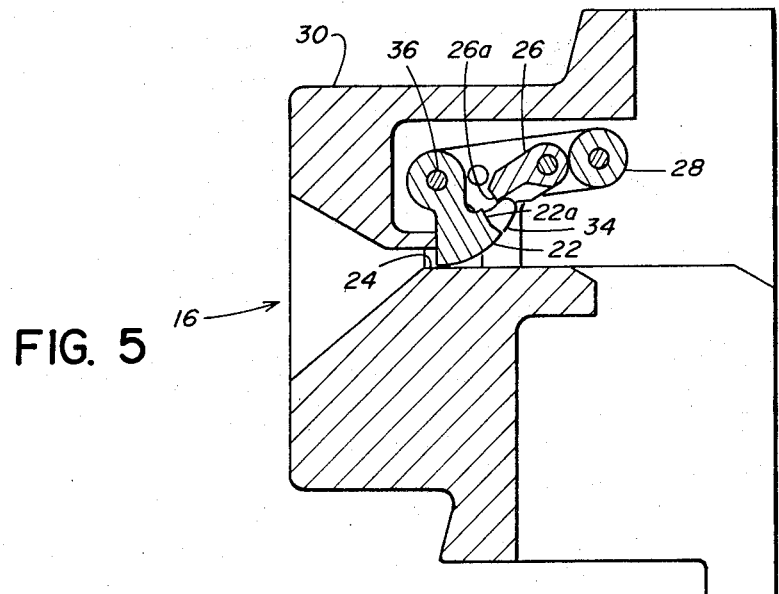
Figure 6:
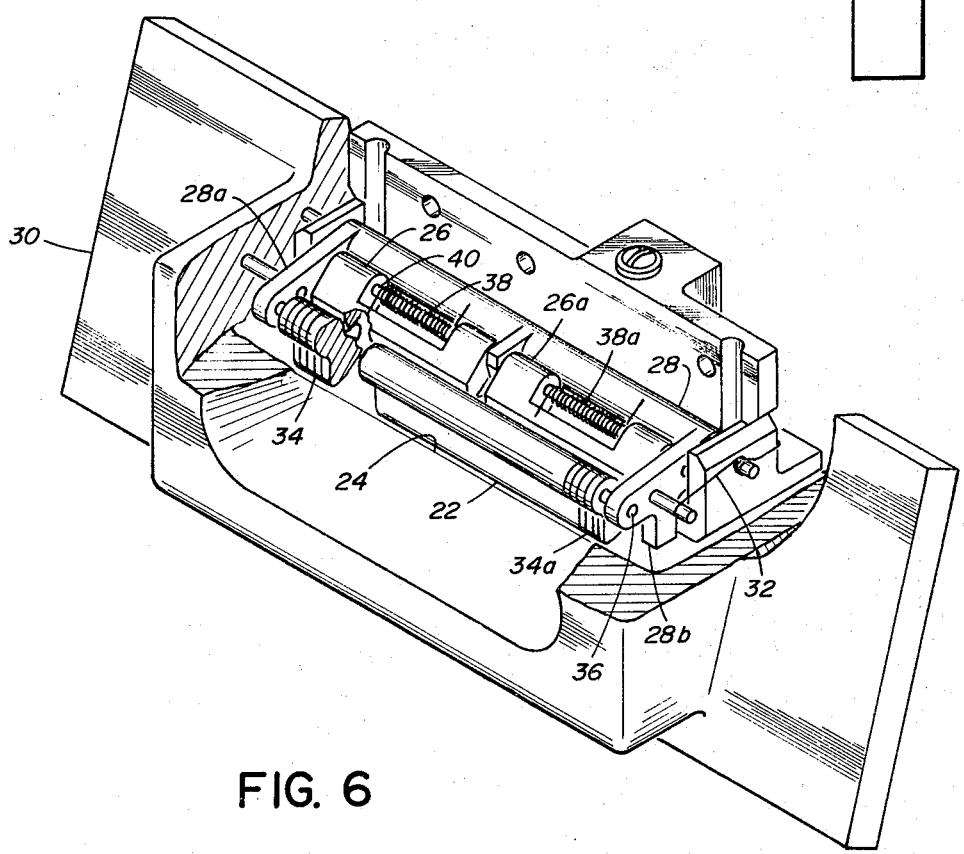
FIG. 6 is a perspective view, partially broken away, of the entry control gate in accordance with the present invention.

When the actuating lever 28 in its biased position, each of the triggers 34 and 34a are in a position as illustrated in FIG. 3 with the front surface of each in the path of the throat 24. Note that the triggers 34 and 34a are positioned at opposite ends of the throat 24 and the entry gate 22, as best illustrated in FIG. 6. In the position shown in FIG. 3, and also shown in FIG. 4, the trigger 34 engages a camming surface of the locking bar 26. Trigger 34, as shown in FIG. 6, engages the camming surface of the locking bar 26 and the trigger 34a engages a camming surface of the locking bar 26a. Both the locking bars 26 and 26a are biased into the position shown in FIG. 4 by springs 38 and 38a. They are pivotally mounted to the actuating lever 28 by means of a shaft 40. When the trigger 34 and the actuating bars 26 and 26a are in a position as illustrated in FIG. 4, the entry gate 22 is held into a position to close off the throat 24 by an engagement between the locking bars 26 and 26a and a locking surface 22a of the gate, as illustrated in FIG. 5. Anyone attempting to insert an object into the console 10 against the gate 22 would be prevented by the gate being in a locked position.

To operate the entry gate into an opened position, a properly sized credit card is inserted through the throat 24. One corner of the card engages the trigger 34 and the other corner engages the trigger 34a. A force applied to these triggers by the card causes them to be rotated against the respective locking bars 26 and 26a, thereby rotating the bars clockwise from a first position as shown in FIG. 4 into a second position. As the locking bars 26 and 26a are rotated clockwise into a second position, the locking surface 22a of the gate 22 is no longer aligned with the locking bars and is free to rotate from a first position as shown in FIG. 5 to a position for allowing entry of a credit card through the throat 24 into the card reader of the console 10.

Note in FIG. 5 there is a clearance between the entry gate 22 and the locking surface 26a of the locking bar 26. This permits the locking bar to be rotated away from the locking surface 22a before engagement therewith upon actuating the triggers 34 and 34a.

As mentioned previously, near the completion of a dispensing transaction, the credit card is returned to the user through the throat 24. As the card handler transports the credit card into the area of the throat, it engages an arcuate section of the entry gate 22. This arcuate section faces inward toward the dispensing mechanism. The force produced by the card on the arcuate section of the gate 22 causes the actuating lever 28 to be rotated clockwise against the spring 32 from the position shown in FIG. 2. Rotation of the actuating lever 28 lifts the triggers 34 and 34a and the gate 22 to provide an outlet for removal of the credit card from the system. After a user has removed the credit card from the throat 24, the spring 32 again returns the actuating lever 28 into the position shown in FIG. 2. With the actuating lever 28 in this position, the gate 22 again controls entry into the console 10.

While only one embodiment of the invention, together with modifications thereof, has been described in detail herein and shown in the accompanying drawings, it will be evident that various further modifications are possible without departing from the scope of the invention.

What is claimed is:

1. Apparatus for document entry control into a dispensing system, comprising in combination:
   a housing having a passage therein to orient a presented document for transport into the dispensing system,
   an actuating lever pivotally mounted to said housing to rotate about a position intermediate with the passage,
   a trigger pivotally mounted to said actuating lever and extending into the passage of said housing,
   a locking bar pivotally mounted to said actuating lever to be rotated from a first position to a second position by actuating said trigger to engage said locking bar, and
   a gate pivotally mounted to said actuating lever to be locked in a first position for barring entry of a document into the dispensing system by engagement with said locking bar when in the first position and rotatable to a second position by a document in the passage of said housing with the locking bar in the second position thereof.

2. Apparatus for document entry control into a dispensing system as set forth in claim 1 wherein said gate has an arcuate section facing inward into the dispensing system to be engaged by a document exiting through the passage to rotate said actuating lever into a position to allow removal of the document from the dispensing system.

3. Apparatus for document entry control into a dispensing system as set forth in claim 1 wherein said trigger and said gate are pivotally mounted on a common shaft and said trigger rotates into engagement with the locking bar by a document in the passage of said housing.

4. Apparatus for document entry control into a dispensing system as set forth in claim 1 including a spring for biasing said locking bar into the first position thereof.

5. Apparatus for document entry control into a dispensing system as set forth in claim 1 including a spring for biasing said actuating lever into a position wherein said gate when in the first position bars entry of a document into the dispensing system.

6. Apparatus for document entry control into a dispensing system, comprising in combination:
   a housing having a passage therein to orient a presented document for transport into the dispensing system,
   an actuating lever pivotally mounted to said housing to rotate about a positive intermediate with the passage,
   a trigger pivotally mounted to said actuating lever and extending into the passage of said housing,
   a locking bar pivotally mounted to said actuating lever to be rotated from a first position to a second position by actuating said trigger to engage said locking bar, and
   a gate pivotally mounted on a common shaft with said trigger to said actuating lever to be locked in a first position for barring entry of a document into this dispensing system by engagement with said locking bar when in the first position and rotatable to a second position by a document in the passage of said housing with the locking gate in the second position thereof, said gate having an arcuate section facing inward into the dispensing system to be engaged by a document exiting through the passage to rotate said actuating lever into a position to allow removal of the document from the dispensing system.

7. Apparatus for document entry control into a dispensing system as set forth in claim 6 wherein said trigger rotates into engagement with the locking bar by a document in the passage of said housing.

8. Apparatus for document entry control into a dispensing system as set forth in claim 7 including a spring for biasing said locking bar into the first position thereof.

9. Apparatus for document entry control into a dispensing system as set forth in claim 8 including a spring for biasing said actuating lever into a position wherein said gate when in the first position bars entry of a document into the dispensing system.

10. Apparatus for document entry control into a dispensing system, comprising in combination:
a housing having a passage therein to orient a presented document for transport into the dispensing system,
an actuating lever pivotally mounted to said housing to rotate about a position intermediate with the passage,
a first trigger pivotally mounted to said actuating lever and extending into the passage of said housing,
a first locking bar pivotally mounted to said actuating lever to be rotated from a first position to a second position by actuating said first trigger to engage said locking bar,
a second trigger pivotally mounted to said actuating lever and extending into the passage of said housing,
a second locking bar pivotally mounted to said actuating lever to be rotated from a first position to a second position by actuating said second trigger to engage said locking bar, and
a gate pivotally mounted to said housing to be locked in a first position for barring entry of a document into the dispensing system by engagement with said first and second locking bars when in the first position thereof and rotatable to a second position by a document in the passage with the first and second locking bars in the second position thereof.

11. Apparatus for document entry control into a dispensing system as set forth in claim 10 wherein said first and second triggers and said gate are pivotally mounted on a common shaft and said first and second triggers rotate into engagement with the respective locking bars by a document in the passage of said housing.

12. Apparatus for document entry control into a dispensing system as set forth in claim 11 wherein said first trigger is located at one end of said gate and said second trigger is located on the opposite end of said gate.

13. Apparatus for document entry control into a dispensing system as set forth in claim 10 wherein said gate has an arcuate section facing inward into the dispensing system to be engaged by a document exiting through the passage to rotate said actuating lever into a position to allow removal of the document from the dispensing system.

14. Apparatus for document entry control into a dispensing system as set forth in claim 10 including a spring for biasing said first and second locking bars into the first positions thereof.

15. Apparatus for document entry control into a dispensing system as set forth in claim 10 including a spring for biasing said actuating lever into a position wherein said gate when in the first position bars entry of a document into the dispensing system.

16. Apparatus for document entry control into a dispensing system, comprising in combination:
a housing having a passage therein to orient a presented document for transport into the dispensing system,
an actuating lever pivotally mounted to said housing to rotate about a position intermediate with the passage,
a first trigger pivotally mounted to said actuating lever and extending into the passage of said housing,
a first locking bar pivotally mounted to said actuating lever to be rotated from a first position to a second position by actuating said first trigger to engage said locking bar,
a second trigger pivotally mounted on a common shaft with said first trigger to said actuating lever and extending into the passage of said housing,
a second locking bar pivotally mounted on a common shaft with said first locking bar to said actuating lever to be rotated from a first position to a second position by actuating said second trigger to engage said locking bar, and
a gate pivotally mounted on a common shaft with said first and second triggers to said lever to be locked in a first position for barring entry of a document into the dispensing system by engagement with said first and second locking bars when in the first position and rotatable to a second position by a document in the passage with the first and second locking bars in the second position thereof.

17. Apparatus for document entry control into a dispensing system as set forth in claim 16 wherein said gate has an arcuate section facing inward into the dispensing system to be engaged by a document exiting through the passage of said housing to rotate said actuating lever into a position to allow removal of the document from the dispensing system.

18. Apparatus for document entry control into a dispensing system as set forth in claim 17 wherein said first trigger is located on one end of said gate and said trigger is located on the opposite end of said gate.

19. Apparatus for document entry control into a dispensing system as set forth in claim 18 including a spring for biasing said actuating lever into a position wherein said gate when in the first position bars entry of a document into the dispensing system.

20. Apparatus for document entry control into a dispensing system as set forth in claim 19 including a spring for biasing said first and second locking bars into the first position thereof.

21. Apparatus for document entry control into a dispensing system, comprising in combination:
a housing having a passage therein to orient a presented document for transport into the dispensing system,
a trigger pivotally mounted to said housing and extending into the passage thereof, a locking bar pivotally mounted to said housing to be rotated from a first position to a second position by actuating said trigger to engage said locking bar, and a gate pivotally mounted to said housing to be locked in a first position for barring entry of a document into the dispensing system by engagement with said locking bar when in the first position and rotatable to a second position by a document in tne passage of said housing with the locking bar in the second position thereof.

22. Apparatus for document entry control into a dispensing system as set forth in claim 21 wherein said trigger and said gate are pivotally mounted on a common shaft and said trigger rotates into engagement with the locking bar by a document in the passage of said housing.

23. Apparatus for document entry control into a dispensing system as set forth in claim 22 including a spring for biasing said locking bar into the first position thereof.

* * * * *

PO-1050
(5/69)

UNITED STATES PATENT OFFICE
CERTIFICATE OF CORRECTION

Patent No. 3,766,687         Dated October 23, 1973

Inventor(s) Bryan K. Henson

It is certified that error appears in the above-identified patent and that said Letters Patent are hereby corrected as shown below:

Col. 2, line 27, after "card" insert --gate--;
       line 37, cancel "copending";
       line 38, cancel "application"
       lines 40 and 41, "Serial No. 59,241, filed July 29, 1970,and" should be --U. S. Patent No. 3,715,569--.

Col. 3, lines 19 and 20, "actuating" should be --locking--;
       line 43, "26a" should be --27--.

Col. 4, line 53, "positive" should be --position--.

Col. 7, line 9, "tne" should be --the--.

Signed and sealed this 19th day of March 1974.

(SEAL)
Attest:

EDWARD M. FLETCHER, JR.                C. MARSHALL DANN
Attesting Officer                       Commissioner of Patents